United States Patent
Wolfson

[15] 3,677,286
[45] *July 18, 1972

[54] VALVE

[72] Inventor: Joseph Wolfson, Rocky Hill, Conn.

[73] Assignee: Bloomfield Valve Corporation, Bloomfield, Conn.

[*] Notice: The portion of the term of this patent subsequent to Aug. 10, 1988, has been disclaimed.

[22] Filed: Nov. 25, 1970

[21] Appl. No.: 92,570

Related U.S. Application Data

[62] Division of Ser. No. 837,769, June 30, 1969, Pat. No. 3,598,145.

[52] U.S. Cl.................................137/469, 137/533.31
[51] Int. Cl.......................................................F16k 15/06
[58] Field of Search.................137/469, 533.21, 533.31; 251/359, 364

[56] References Cited

UNITED STATES PATENTS

| | | | |
|---|---|---|---|
| 79,182 | 6/1868 | Ashcroft | 137/469 |
| 86,168 | 1/1869 | Low | 137/469 |
| 3,018,792 | 1/1962 | Brucker | 137/469 |
| 1,873,318 | 8/1932 | Eason, Jr. | 137/533.21 |
| 3,224,646 | 12/1965 | Bruns | 137/533.31 |

FOREIGN PATENTS OR APPLICATIONS 927,994  6/1963  Great Britain...................137/533.31

Primary Examiner—Robert G. Nilson
Attorney—Fishman and Van Kirk

[57] ABSTRACT

A valve having a disc member which cooperates with the valve seat to perform the valving action, the disc member being characterized by a sail which will be acted upon by fluid in the system to cause rapid and full opening and closing of the valve regardless of the position thereof. The seat and disc members respectively have a complementary frustoconical aperture and a plug portion and the sail is spaced from the seat with the valve in the closed condition.

1 Claim, 2 Drawing Figures

INVENTOR
JOSEPH WOLFSON
BY Fishman and Van Kirk
ATTORNEYS

VALVE

CROSS-REFERENCE TO RELATED APPLICATION

This application is a division of application Ser. No. 837,769 filed June 30, 1969, now U.S. Pat. No. 3,598,145 issued Aug. 10, 1971.

BACKGROUND OF THE INVENTION

1. Field of the Invention

The present invention relates to valves. More particularly, the present invention is directed to fast action valves having readily replaceable components and being operable in any position Accordingly, the general objects of the present invention are to provide improved apparatus of such character.

2. Description of the Prior Art

Presently available valves, and particularly check valves, have one or more inherent deficiencies. Perhaps the most significant of these deficiencies resides in the fact that present valves cannot usually be repaired and repair, when possible, requires removal of the valve from the fluid system in which it is connected. Thus, should the valve seat or plug become eroded thereby causing leakage, it is necessary to perform the time consuming task of removing and replacing the valve.

Another deficiency found in presently available check valves is, with the exception of the relatively expensive electro-magnetic devices, is that the valve will generally not open fully in response to fractional pressure. Thus, should system pressure drop, present check valves will respond by adding resistance to the system.

While it has been proposed to employ self-lubricating materials such as Teflon in valves, valves employing such self-lubricating materials have generally been characterized by metal parts having a coating of the material thereon. Such coatings, of course, suffer degradation with time and use and recoating is generally neither possible nor practical.

A further problem which has characterized prior art valves is that, due to their design, there is the residual possibility that certain flow conditions can cause canting of the plug member whereby, upon a pressure reversal, the valve will jam rather than close. The possibility of plug canting becomes particularly acute upon the occurrence of a fractional pressure condition as discussed above.

While usually giving adequate performance during their comparatively limited lives, presently available check valves are not characterized by rapid action. In most cases, a spring member or diaphragm maintains the valve in one operative condition and it is necessary to overcome the force imposed by the spring or diaphragm when switching to the other operative condition. The overcoming of these forces, of course, takes time thereby limiting the speed of response of present valves.

It is also to be noted that presently available check valves are designed for use in a particular environment and are not susceptible to interchangeable use in both liquid and gas systems. This, of course, presents a distinct disadvantage, particularly when it is desired to simulate one type of system with another.

SUMMARY OF THE INVENTION

The present invention overcomes the above-discussed disadvantages of the prior art and in so doing provides a valve of novel and improved design. The valve of the present invention comprises a body portion which may be fabricated from any metal or plastic as might be determined by the particular application. The valve is further characterized by a seat comprised of a "self-lubricating" plastic material. The present valve also comprises a disc member which cooperates with the seat to produce the valving action. The disc member is readily removable and also comprised of a "self-lubricating" plastic material and thus is characterized by light weight. The disc member consists of a guide post and a plug which are separated by a sail portion. The surface areas of the sail portion are sufficiently large so that, coupled with the light weight of the disc member, the valve will be fully opened and rapidly closed in response to pressure which is a fraction of the normal system pressure.

It is therefore an object of the present invention to provide a valve which will operate on fractional pressure.

It is another object of the present invention to provide a valve which is incapable of sticking due to canting of the disc member.

It is yet another object of the present invention to provide a check valve having faster response than previous devices of such character.

It is still another object of the present invention to provide a valve which will operate in any position.

It is also an object of the present invention to provide a valve which may be employed in either liquid or gas systems.

BRIEF DESCRIPTION OF THE DRAWING

The present invention may be better understood and its numerous objects and advantages will become apparent to those skilled in the art by reference to the accompanying drawing wherein like reference numerals refer to like elements in the various figures and in which.

DESCRIPTION OF THE PREFERRED EMBODIMENT

Figure 1:
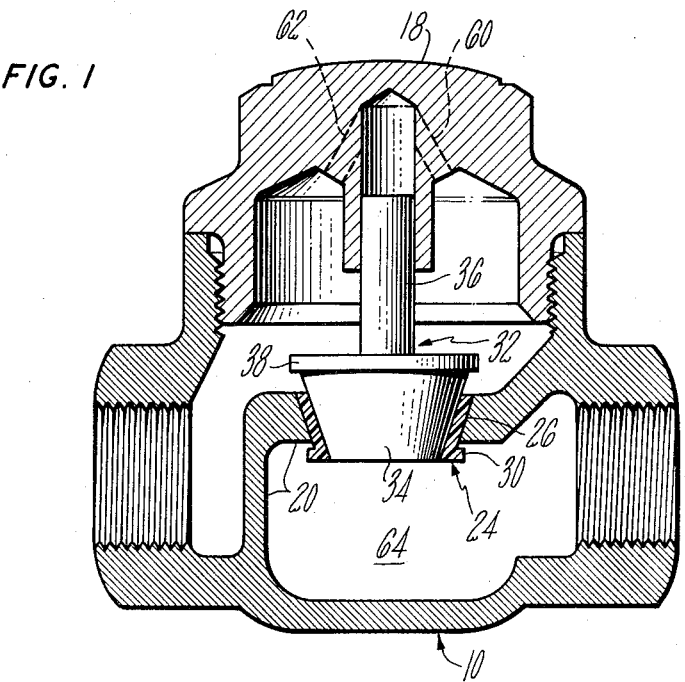
FIG. 1 is a cross-sectional view of a preferred embodiment of the present invention shown in the closed portion.
Figure 2:
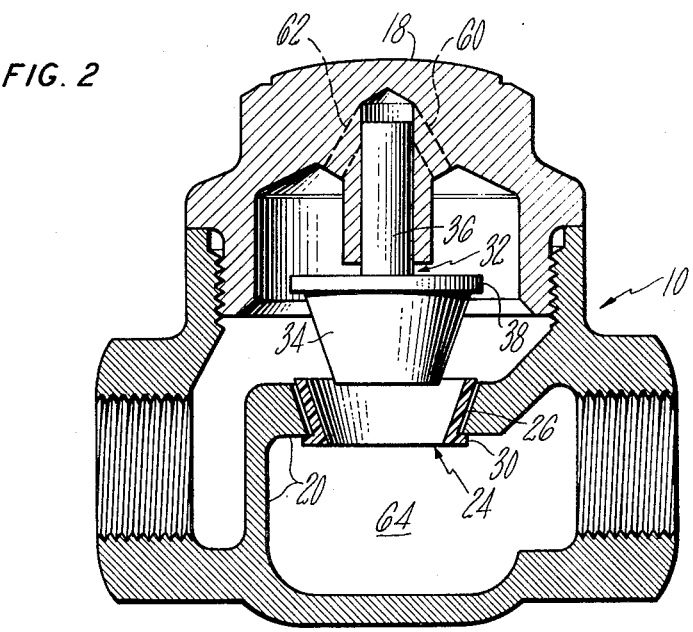
FIG. 2 is a cross-sectional view of the valve of FIG. 1, FIG. 2 showing the valve in the open position.

Referring now to FIG. 1, the body of the disclosed preferred embodiment of the check valve of the present invention is indicated generally at 10. Valve body 10 is provided with internally threaded connector portions 12 and 14 by which the valve may be connected into a fluid flow system. Valve body 10 is also provided with a threaded portion 16 by means of which cap 18 is attached to the valve body. The purpose of cap 18 will be discussed in greater detail below. The valve body will typically be cast from a metal having the desired characteristics taking into account the environment in which it is to be used. Valve body 10 could, of course, also be plastic and the valve body could be machined rather than cast.

Internally of valve body 10, a web member 20 extends from one side of the valve body adjacent connector portion 12 to the opposite side of the valve body adjacent connector portion 14. Web member 20 has a hole therein intermediate its ends. Under normal operating conditions, fluid flowing into the valve housing 10 through connector portion 14 will pass through the hole in web member 20 and leave the valve housing via connector portion 12.

An apertured valve seat member, indicated generally at 24, is positioned in the hole in web member 20. Valve seat member 24 will be comprised of a "self-lubricating", high temperature plastic material, Teflon being preferable. Teflon seat member 24 is formed by state of the art techniques so as to have a frustoconical or inwardly tapering internal surface. Shaping of the valve member in this manner provides maximum seating surface. Tests have shown that the diameter of the smaller end of the aperture in the valve seat 24 shoulder preferably be within the ratio of 1/2.66 to 1/1.25 of the diameter of the aperture at the other side of the seat, a 1:2 ratio being preferred. Since Teflon has a certain degree of resiliency, seat member 24 may be forced through the hole in web member 20 and thus may be snapped into position in the valve housing. Removal and replacement of seat 24, if such should become necessary, will be described below.

Cooperating with valve seat 24 to perform the valving action is a disc member indicated generally at 32. Disc member 32 has a frustoconical shaped plug portion 34, a guide post 36 and, intermediate guide post 36 and plug 34, a sail member 38. The areas of the exposed upper and lower surfaces of sail portion 38 are considerably greater than those of either the top of guide post 36 or the bottom of plug 34. The disc member 32, like valve seat 24, will be comprised of a "self-lubricating" high temperature plastic, Teflon again being preferred. The shape of plug portion 34 of disc member 32 is commensurate with that of the aperture in valve seat member 24 and thus, with disc member 32 in the position shown in FIG. 1, the valve will be closed.

Before further describing the invention, operation of the disclosed preferred embodiment will be described. When pressure is applied to a system of which the valve is a part, the pressure source being connected to connector portion 14 of housing 10, the fluid will act on the bottom of plug member 34 to thereby begin to unseat the plug member from the valve area 24. As soon as the slightest unseating occurs, the system fluid will act on the lower surface of sail member 38 and, due to the light weight of the disc member and the large surface area of the sail. Should it be desired to replace the valve seat, it may either be cut out or pulled free by means of a tool designed for that purpose. The old seat will then be discarded and a new valve seat snapped into position. Since they are formed from a plastic material, the valve seat and disc members are relatively inexpensive and thus replacement thereof is economically sound. The valve body, which is the most expensive element of the valve, will have an indefinite life in the present invention.

It should be noted that, due to the light weight and the particular configuration of disc member 32, the valve of the present invention may be employed in both liquid and gas systems and the valve will operate in any position. The ability to operate in any position is a direct result of the fact that the valve has only a single moving part which is controlled solely and operated fully by the system pressure differential.

While a preferred embodiment has been shown and described, various modifications and substitutions may be made thereto without departing from the spirit and scope of the present invention. Accordingly, it is to be understood that the present invention has been described by way of illustration and not limitation.

What is claimed is:

1. A valve including:

a body portion, said body portion defining a chamber and channel defining means extending into said chamber;

means in said body portion chamber for supporting a valve seat member, said supporting means including an aperture;

a plastic valve seat member having an aperture passing therethrough which defines a frustoconical seating surface, said plastic member further having an outer surface defining portion having an external shape complementary to the shape of the aperture in said supporting means and having a flange extending outwardly from at least one end thereof, said flange having a size and shape sufficient to retain said plastic member in the aperture in said supporting means; and a disc member cooperating with said plastic member to effect valving action, said disc member having a frustoconical plug portion for engaging said plastic member seating surface, a sail member and a guide post, the diameter of said plug portion of said disc member along the length thereof varying uniformly from a first end of smaller diameter than the largest diameter of said seating surface to a second end of larger diameter than the largest diameter of said seating surface, said sail member extending transversely of the axis of said plug portion from a location along said plug portion of larger diameter than the largest diameter of said seating surface, said guide post extending from the larger diameter end of and co-axially of said plug portion, said guide post extending into and being movable in said channel defining means whereby said disc member is axially movable between a first closed position and an open position, said frustoconical plug engaging said frustoconical seating surface to solely seal said valve in said closed position and said sail being spaced from said plastic member in said closed position, said disc member being free to rotate about its axis under the influence of fluid flowing through said valve with the valve in said open position.

* * * * *